United States Patent [19]

Telly et al.

[11] Patent Number: 4,549,684
[45] Date of Patent: Oct. 29, 1985

[54] ULTRASONIC WELDING SYSTEM AND METHOD EMPLOYING A REDUCED NUMBER OF POWER SUPPLIES

[76] Inventors: Gary R. Telly; Scott R. Telly, both of 6202 Whispering Oaks, Washington, Mich. 48094

[21] Appl. No.: 469,776
[22] Filed: Feb. 25, 1983
[51] Int. Cl.$^4$ .................. B23K 20/10; B29C 27/08
[52] U.S. Cl. .................. 228/110; 156/73.1; 228/6.1
[58] Field of Search .................. 228/1 B, 110, 111; 156/73.1, 73.2, 73.3, 73.4

[56] References Cited

U.S. PATENT DOCUMENTS

| | | | |
|---|---|---|---|
| 3,209,448 | 10/1965 | Jones | 228/1 B X |
| 3,830,524 | 8/1974 | Abildgaard et al. | 156/73.1 |
| 4,401,501 | 8/1983 | Stumpf | 228/1 B X |
| 4,409,659 | 10/1983 | Devine | 228/110 X |
| 4,426,244 | 1/1984 | Wang | 228/1 B X |

FOREIGN PATENT DOCUMENTS

2355333 10/1974 Fed. Rep. of Germany ...... 228/1 B

*Primary Examiner*—Kenneth J. Ramsey

[57] ABSTRACT

An improved ultrasonic welding system and an improved ultrasonic welding method is disclosed herein. The welding system is specifically designed for enabling a single radio frequency power generator to provide a different tuned r.f. signal to each of a plurality of transducers. Each of the tuned r.f. signals is individually tailored to one of a plurality of transducer/booster/welding horn/workpiece assemblies for transmitting substantially optimized doeses of ultrasonic vibrations to a workpiece. This is accomplished by utilizing a plurality of turning coils, one of the tuning coils associated with one of the transducer/booster/welding horn/workpiece assemblies. By reducing the requisite number of radio frequency power generators, a substantial amount of money and space may be saved.

17 Claims, 3 Drawing Figures

ULTRASONIC WELDING SYSTEM AND METHOD EMPLOYING A REDUCED NUMBER OF POWER SUPPLIES

FIELD OF THE INVENTION

This invention relates generally to a method and apparatus for ultrasonically welding a workpiece and more particularly to a method and apparatus for economically and efficiently performing a plurality of ultrasonic welding operations, said operations accomplished by a plurality of multiconfigured welding horns driven by a single power source.

BACKGROUND OF THE INVENTION

Ultrasonic energy is commonly employed to securely interconnect portions of regularly or irregularly shaped workpieces. In ultrasonic welding processes, localized heating and softening of the workpiece being welding is induced by ultrasonic vibrations communicated thereto. Although ultrasonic welding is a process particularly suited for joining thermoplastic materials, since it is relatively fast, generates no fumes or waste material, and results in an extremely durable bond, the principles of the present invention are applicable to interconnect two workpieces of other materials as well.

In a typical ultrasonic welding system, acoustic energy is produced from electromagnetic energy by means of a transducer, also referred to as a converter. The transducer includes piezoelectric material as its action element which is adapted to produce mechanical vibrations when an electric field is shunted thereacross. Operatively connected to the transducer is a source of alternating current which transmits the electrical field across the piezoelectric material. Typically, radio frequency (hereinafter referred to as r.f.) energy of 20 kilohertz is transmitted to the transducer by a r.f. power generator, and accordingly, the piezoelectric material viabrates at the same 20 kilohertz frequency.

The welding operation is carried out by means of a welding tool generally referred to as a welding horn. The welding horn must make solid mechanical contact with both the transducer which supplies the acoustic energy thereto and the workpiece to which it transmits ultrasonic viabrations. The welding horn is usually shaped and massed into a particular configuration designed to optimize the transfer of ultrasonic vibrations to the workpiece; accordingly, its length, width, shape and mass determine the necessary frequency and waveform of the acoustic energy, as well as the physical properties (e.g. dimensions, material, thickness etc.) of the workpiece. It is usually necessary to employ differently configured welding horns to accomplish various welds on a single workpiece. Because of the degree of mechanical vibration and thermal stress to which the welding horns are exposed, they are formed of durable materials such as titanium and the like.

It is advantageous in many instances to employ a "booster", also referred to as a velocity transformer, in conjunction with an associated transducer and welding horn pair. The booster is fixedly attached to the transducer so as to make solid mechanical contact both with the transducer and the welding horn assembly. It is a function of the booster to modify the amplitude of the acoustic energy generated by the transducer, and thereby individually tailor the ultrasonic vibrations ultimately transmitted by the welding horns to the workpiece. The booster is a generally cylindrical, solid member of a particular shape to provide a specific mass; the shape and mass being chosen so that the booster will convert an acoustic wave pattern inputted thereinto by the transducer, into an output ultrasonic vibration transmitted to the welding horn. While the booster does not change the frequency of the vibration, it is adapted to adjust the amplitude thereof, i.e. the distance the vibrating welding horn will travel in each oscillatory cycle.

Further control of the ultrasonic vibrations delivered to the workpiece is accomplished by the use of a tuning coil operatively connected to the r.f. power generator. The tuning coil matches the impedence of the r.f. power generator to produce the optimum ultrasonic signal, taking into consideration the impedence characteristics of the transducer, booster, welding horn, and workpiece. Through the selection of the proper booster/welding horn combination, combined with preselected tuning of the tuning coil, the amount of ultrasonic energy delivered to the workpiece may be adjusted to the predetermined level. If the r.f. signal from the r.f. power generator were not tuned, the ultrasonic vibration transmitted to the workpiece could either produce a weak weld or damage the workpiece.

The foregoing description of ultrasonic welding has been made with reference to a single welding horn welding system. Obviously, in commercial assembly line processes it is necessary to substantially simultaneously perform a plurality of welding operations upon a workpiece. Accordingly, most commerically available ultrasonic welding systems employ a plurality of welding horns, each energized by its own r.f. power generators via an associated transducer. The utilization of such multihorn apparatus, while resulting in a significant savings of time, are quite expensive since they are essentially an aggregation of single welding horn welding systems. Obviously, if some of the components of the system could be eliminated, a significant savings of space and money would result.

More particularly, the r.f. power generator used to energize the transducers are quite expensive and somewhat bulky. Accordingly, if a single r.f. power supply were specially adapted to energize a plurality of welding horns in a multihorn welding system, the aforementioned savings of space and money would result.

One such multihorn, single r.f. power generator system, albeit not an assembly line system, is described in U.S. Pat. No. 3,830,524 of Abildgaard, entitled "Book Bound By Ultrasonic Means". In the Abildgaard system, a plurality of identically configured welding horns are energized by a single transducer via a plurality of waveguides secured thereto. Abildgaard utilizes a single r.f. power generator and a single transducer to energize the plurality of welding horns. While the system described by Abilgaard does provide a multihorn welding system having a reduced number of components, the patent fails to teach the manufacturing industry how to reduce the number of components in a welding apparatus which requires a plurality of multiconfigured and multimassed welding horns. Because the welding horns of Abildgaard are identically shaped and weighted, no teaching is found therein for individually tuning the ultrasonic vibrations provided by each welding horn to the workpiece. A final restriction on the adaptability of the Abildgaard welding system to larger, industrial welding systems is one of power; since a plurality of welding horns are being simultaneously energized by a single transducer, there are limitations on the power which may be simultaneously delivered to each. For the foregoing reasons, the Abildgaard system is limited to those applications in which the r.f. signal is supplied to a single transducer which energizes a plurality of indentically shaped and massed welding horns to transmit identical doses of relatively low amounts of ultrasonic vibrations to perform a plurality of substantially identical welding operations upon a workpiece.

Accordingly, there exists an industrial need for an improved, economical, space-saving, ultrasonic welding system having (1) a reduced number of components and (2) the capability of employing welding horns of varying configurations and masses which are adapted to weld workpieces of varying thicknesses and materials, and (3) having but a single r.f. power generator. The present invention provides a method and apparatus for economically and reliably performing a plurality of ultrasonic welding operations upon a workpiece, said workpiece including portions of varying thickness and/or portions fabricated from varying materials. This is accomplished by providing a welding system in which the multiconfigured and multimassed plurality of welding horns are energized by a single r.f. power generator, each horn being associated with a mechanism for transmitting an individually tuned acoustic signal thereto, whereby it is possible to deliver an optimum supply of ultrasonic vibrations to each of the workpieces. To that end, the present invention is further equipped with a sequencing mechanism which is adapted to sequentially provide an individually tuned (impedance matched) r.f. signal to each of a plurality of transducers. In short, described hereinbelow is an invention which fulfills a long-felt industrial need for an economical, space-saving, multihorn, ultrasonic welding system adapted to provide individualized doses of ultrasonic energy to the welding horns thereof so as to weld the workpiece.

These and further objects and advantages of the present invention will become clear from the drawings, the detailed description of the invention and the claims which are found herein.

BRIEF SUMMARY OF THE INVENTION

There is disclosed herein a mechanism for individually tuning the r.f. signals which are adapted to be transmitted to the transducers from the r.f. power generating means of an ultrasonic welding system. The welding system conventionally includes an r.f. power generator for transmitting r.f. signals; a plurality of transducers for receiving the r.f. signals from the r.f. power generator, converting the r.f. into acoustic energy and transmitting the acoustic energy to an associated welding horn. A plurality of welding horns are also an important part of the system and are adapted to receive the acoustic energy from an associated transducer and perform a plurality of ultrasonic welding operations on a workpiece. By employing the tuning mechanism of the instant invention, a single r.f. power generator may be used to supply specifically tailored and individually tuned power to a plurality of the transducers so that specifically tuned acoustic energy may be transmitted to each of the welding horns. The welding horns may be multiconfigured and multimassed and the workpiece may include regions to be welded of differing cross-sectional thickness and/or materials. The tuning mechanism is adapted to individually tune the impedance of the r.f. signal transmitted to each transducer so that the acoustic signal generated therefrom is tailored to the specific physical characteristics and properties of the particular workpiece region being welded, as well as the particular welding horn associated with said particular workpiece region. The apparatus of the present invention is able to use but a single r.f. power generator to supply r.f. power to a plurality of multiconfigured and multimassed welding horns by having a preprogrammed mechanism sequentially transmit the tuned r.f. signal to each of the transducers. The tuning mechanism comprises a plurality of tuning coils, equal in number to the number of transducers, with the number of transducers being equal to the number of welding horns. One of the plurality of transducers is associated with a particular welding horn, whereby each tuning coil is associated with a particular transducer and its associated welding horn.

There is further disclosed herein a method for performing a plurality of ultrasonic welding operations on a workpiece utilizing but a single r.f. power generator. The method comprises the steps of: providing a plurality of welding horns; placing the workpiece in weldable contact with the welding horns such that each of the regions of the workpiece to be welded are contacted by a welding horn; operatively connecting a transducer to an associated one of the welding horns, the transducers adapted to receive an r.f. signal, convert said r.f. signal into acoustic energy and transmit that acoustic energy to the associated welding horn; providing a r.f. power generator for transmitting an r.f. signal to each of the transducers; and tuning the r.f. signal transmitted to each transducer, whereby an r.f. signal particularly tailored to the physical characteristics and power requirements of the each individual transducer and its associated welding horn is provided.

DETAILED DESCRIPTION OF THE DRAWINGS

Figure 1:
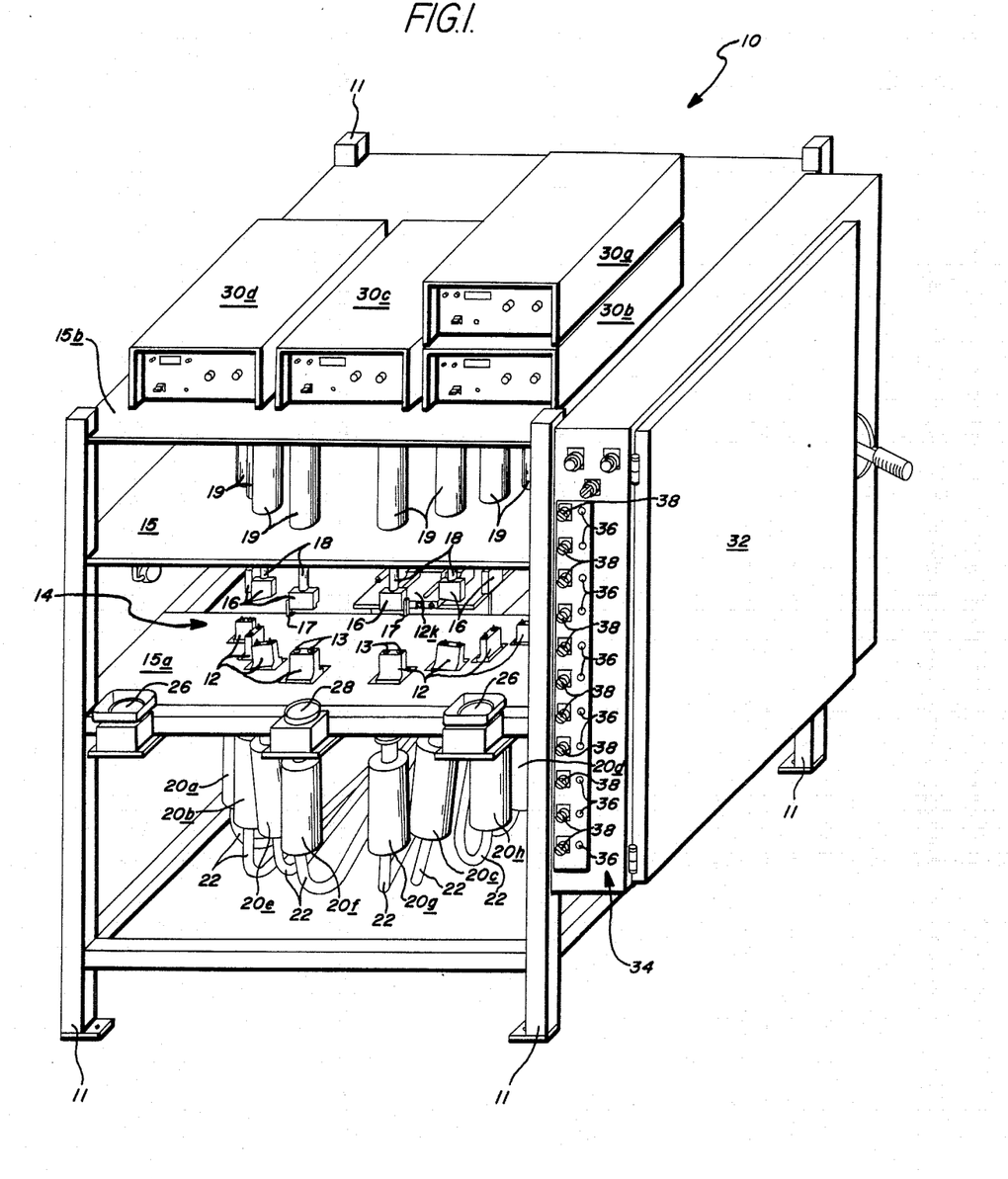
FIG. 1 is a perspective view of the ultrasonic welding system of the present invention illustrating the use of a single r.f. power generator to transmit r.f. signals to a plurality of transducers/booster/welding horn assemblies.

Referring now to the drawings and particularly to FIG. 1, apparatus for ultrasonically welding any two materials in general, and thermoplastic materials in particular, is shown generally by the reference numeral 10. The welding apparatus 10 is housed in a generally rectangularly shaped cabinet which is supported on four vertically disposed legs 11 and which includes a plurality of spaced, generally horizontally disposed shelves, generally 15. Within the confines of the lowermost shelf 15a there is provided the work station 14 in which the workpiece will be mounted during the performance of the welding operations. The ultrasonic welding apparatus 10 further includes a plurality of welding horns 12, so disposed within the confines of the work station 14 thereof as to be adapted for forming a plurality of weld joints to interconnect the two halves 40a and 40b (see FIG. 2) of an irregularly shaped workpiece 40. The welding horns 12, which will be described in greater detail hereinafter, are provided with welding tips 13 adapted to contact and weld the workpiece by transmitting ultrasonic vibrations thereto. It is therefore necessary that the welding horns 12 be aligned in the work station 14 of the apparatus 10 with those points of the particular workpiece 40 which require welding. Obviously, if a workpiece of a different size, shape or material than the size, shape or material of the workpiece 40 of FIG. 2 was to be welded, a different overall array of welding horns 12 and different configurations of individual welding horns 12 would be employed.

As is well known in the art, each of the welding horns 12 are energized by acoustic energy received from and generated by an associated transducer generally referenced by the numeral 20. The transducers 20 typically contain a piezoelectric material, such as quartz crystals, which are adapted to generate acoustic energy upon application of a voltage thereacross. In the welding apparatus 10 of the instant invention, power from a r.f. generator, generally 30, having a standard operating frequency of 20 kilohertz is delivered to the transducers 20, via r.f. cables 22. The acoustic energy generated by the transducers 20 is conveyed to the associated welding horn 12 via a velocity transformer 24, also referred to in the art as a booster, said booster 24 adapted to adjust the amplitude and power of the acoustic energy. By use of an appropriately adjusted booster, the amplitude and velocity of vibration of each welding horn 12 may be optimized for transmitting ultrasonic vibrations individualized for workpieces of varying materials and thicknesses.

Since the transducers 20 are adapted to convert r.f. energy into acoustic energy, they may be referred to as converters. The Branson Model 402 converter is one commercially available transducer adapted for use in welding apparatus, although other makes and models may be substituted in keeping with the spirit of the invention. As described above, the converter 20 is energized by the r.f. signal and it, in turn, generates an acoustic signal of a similar frequency. The acoustic signal is analogous to audible sound waves insofar as it is comprised of mechanical vibrations of the medium in which it is propagated. However, the acoustic energy generated by the transducer 20 has a frequency much higher than audible sound, and hence is termed ultrasonic. Ultrasonic waves are capable of fusing two materials by heating those materials due to rapid mechanical viabrations induced therein.

The acoustic energy thus generated by the transducers 20 may directly be used in welding operations, although it is sometimes preferable and commonly necessary to modify the power and amplitude of the ultrasonic vibrations transmitted to the the material being welded. This modification is accomplished by the booster 24 which is operatively disposed in physical and mechanical contact with the transducer 20. The booster 24 is a rigid mechanical member having a preselected shape and mass distribution, and is adapted to change the velocity and the amplitude ofthe acoustic signal it receives. Physically and operationally coupled to the booster 24 is the welding horn 12, which is the tool adapted to contact the workpiece for weldment thereof. The welding horn 12 is generally formed in a shape optomized to deliver the proper power and amplitude of ultrasonic vibrations to the workpiece 40. That is to say, its mass, length and overall geometric configuration is chosen with reference to the wavelength and power of the ultrasonic vibrations it must convey, so that the standing wave patterns established will efficiently transfer said ultrasonic vibrations to the workpiece 40. As used herein, the terms: "multiconfigured" shall mean welding horns of varying sizes and shapes; and "multimassed" shall mean welding horns of varying weights. Integrally formed or otherwise provided on the distal end of the welding horns 12 may be the one or more welding tips 13 which are adapted to provide the point of abutment with and the transfer of an ultrasonic vibrational signal to the workpiece 40. By utilizing multiple tips 13, a single welding horn 12 may transfer the ultrasonic vibrations to a plurality of points on the workpiece 40.

It should now be appreciated that under operating conditions:(1) a transducer 20 converts r.f. energy to acoustic energy and conveys it to the booster 24; (2) the booster 24 optimizes the amplitude and power of the acoustic energy and delivers the same to the welding horn 12; and (3) the welding horn 12 (or tips 13 thereof) contacts and generates a high amount of localized heating of the workpiece halves 40a and 40b, thereby forming weld joints therebetween. Because of the high degree of vibrational and thermal stress which they encounter, the welding horns 12 and welding tips 13, are typically made of a durable material such as titanium or the like.

Also shown in FIG. 1 are a plurality of reciprocally movable clamping elements 16 which are operatively connected to pneumatically operative clamping pistons 18. The clamping elements 16, the clamping pistons 18, and their associated cylinders 19 cooperate to urge the workpiece being welded into, and secure the workpiece in, mechanical contact with the welding horns 12 upon activation of the apparatus 10. Although the clamping pistons 18 are illustrated as being pneumatically operable, hydraulically operated pistons, solenoids, or like means may be employed without departing from the spirit and scope of the present invention.

Located at the front of the welding apparatus 10, adjacent to the lowermost shelf 15a are a pair of start switches 26 which are adapted to initiate the operating cycle of the apparatus 10, and a stop switch 28 which is readily accessible for terminating the operating cycle. It is to be noted that both start switches 26 must be depressed by the operator of the apparatus 10 within 160 milliseconds of one another in order to initiate operation of the apparatus 10. The use of two such start switches 26 represents a safety feature designed to prevent inadvertant activation of the apparatus 10, and the possible injury to the inadvertant operator that could result.

Located atop the apparatus of the instant invention 10, on uppermost shelf 15b, are a plurality of r.f. power generators 30 for providing r.f. energy to the transducers 20, which, in turn, generate acoustic energy for delivery to the appropriate welding horns 12, which finally transmit ultrasonic vibrations to and weld the thermoplastic workpiece 40. It is critical to the understanding of the instant invention to note there are only four r.f. power generators 30 present in the welding apparatus 10 of FIG. 1, while there are 11 welding horns 12, each having an associated transducer 20 and booster 24, which must be powered by those four r.f. power generators 30. Accordingly, one r.f. power generator 30 is adapted to supply r.f. power to a plurality of welding horns 12 of different shapes, sizes and masses, via the transducer 20 and booster 24. For example, the r.f. power generator 30a shown in FIG. 1 is a Branson Model 184P r.f. power generator which is conventionally adapted to energize only a single transducer; however, pursuant to the principles of the instant invention, this r.f. power generator 30a is specially adapted to energize a plurality of transducers, such as 20a, 20b, 20c and 20d. In a like manner: a second r.f. power generator 30b, which is also a Branson Model 184P, is specially adapted to energize transducers 20e, 20f, 20g and 20h; a third r.f. power generator 30c, which is a Branson Model 182P, is specially adapted to energize two transducers (not shown); and a fourth r.f. power generator 30d, a Branson Model 187P, operates in a conventional manner and energizes only the single transducer 20k. Note that the Branson Model 187P is designed to supply r.f. power to the heavy duty transducer 20k operating at 220 volts, whereas the other transducers 20a–20j operate at 120 volts. A perusal of FIGS. 1 and 2 clearly indicates the large size and mass of the welding horn 12k, which is operatively associated with the heavy duty transducer 20k. It should thus be apparent that an r.f. signal of great power is required to energize that large welding horn 12k.

The particular application to which the welding apparatus 10 of FIG. 1 is adapted requires only one heavy duty transducer; however, were the apparatus 10 modified to perform a welding task necessitating more than one heavy duty transducer, such transducers could, by employing the principles and concepts disclosed by this invention, all be powered by the single, high r.f. power generator 30d. Note that it is also possible to energize the smaller power transducers such as 20a–20h from the large power generator 30d, by including a transformer and a proper tuning network in accord with the teachings of the instant invention.

Figure 2:
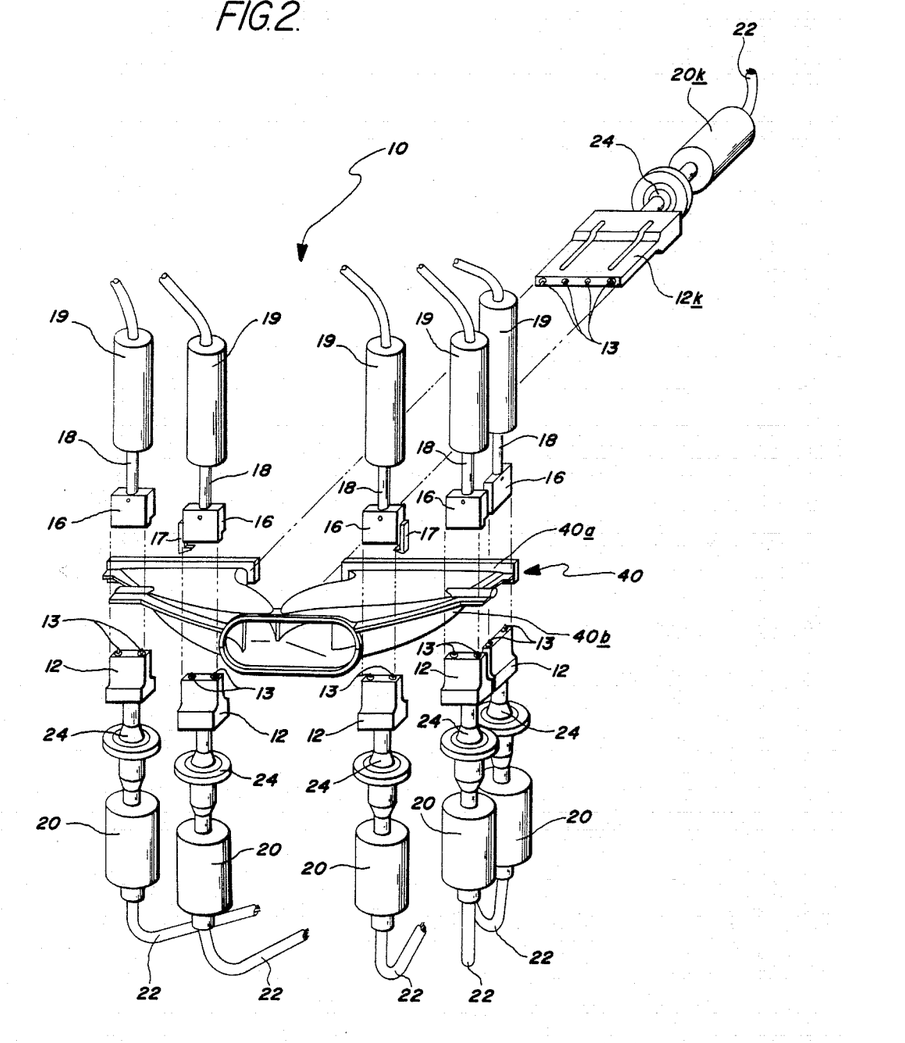
FIG. 2 is an enlarged, exploded, perspective view illustrating the manner in which the operative components of the ultrasonic welding system of the present invention, illustrated in FIG. 1 are adapted to perform the welding operations on a workpiece.

Turning now to FIG. 2, there is illustrated an exploded, perspective view of those components depicted in FIG. 1 which are operatively involved in the welding process. The welding operations of FIG. 2 are performed on the workpiece 40 which consists of the two halves 40a and 40b molded from a styrebe-type polymer, said pieces adapted to be welded into a unitary member. Also illustrated in FIG. 2, are the plurality of pneumatically operated piston 18 and cylinder 19 arrangements, each adapted to reciprocally move an associated clamping element 16. When the welding apparatus 10 is activated, the pistons 18 move downwardly from their retracted position within the cylinder 19 to urge the clamping members 16 into a position wherein the workpiece 40 is forced into firm contact with the welding horns 12, thereby assuring a good transfer of ultrasonic vibrations thereto. Note that hooks 17 may be provided to extend from the clamping elements 16 to rigidly grip the workpiece 40 and further insure a good transmission of the ultrasonic signal. Upon completion of the welding process, the pistons 18 retract into the cylinders 19 so as to access the work area 14 for the removal of the welded workpiece 40 and the introduction of the workpiece halves 40a and 40b to be welded.

While FIG. 2 is illustrative of the (1) general arrangement of the welding horns 12 and their associated transducer/booster assemblies, (2) corresponding arrangement of the clamping system, and (3) manner in which the welding horns 12 and the clamping system cooperate to weld the workpiece 40, note that FIG. 2 is intended to merely be exemplary and, therefore, only six welding horn assemblies as shown (as compared to the eleven welding horn assemblies actually utilized in the machine of FIG. 1).

A control system, generally 31 (see FIG. 3), is provided for sequentially (1) tuning a single r.f. power generator 30 so that said r.f. power generator 30 may transmit a proper r.f. signal to each of a plurality of differently sized, massed and shaped transducer/booster/welding horn combinations, and (2) energizing each of the plurality of transducer/booster/welding horn combinations with the tuned, output r.f. signal from that single r.f. power generator 30. The circuitry and associated components of the control system 31 which are adapted to perform the tuning and sequencing operations, are housed within the control box 32 located on the right hand side panel of the welding apparatus 10. The control box 32 includes a control panel 34 having a plurality of indicators such as lights 36 for providing a visual indication of the particular welding operation being performed at a given point in time. Also included on the control panel 34 are override switches 38 which enable the operator to bypass the automated control system 31 and manually energize a given welding horn 12 to transmit ultrasonic vibrations to the workpiece 40 out of the preprogrammed sequence of operation.

Figure 3:
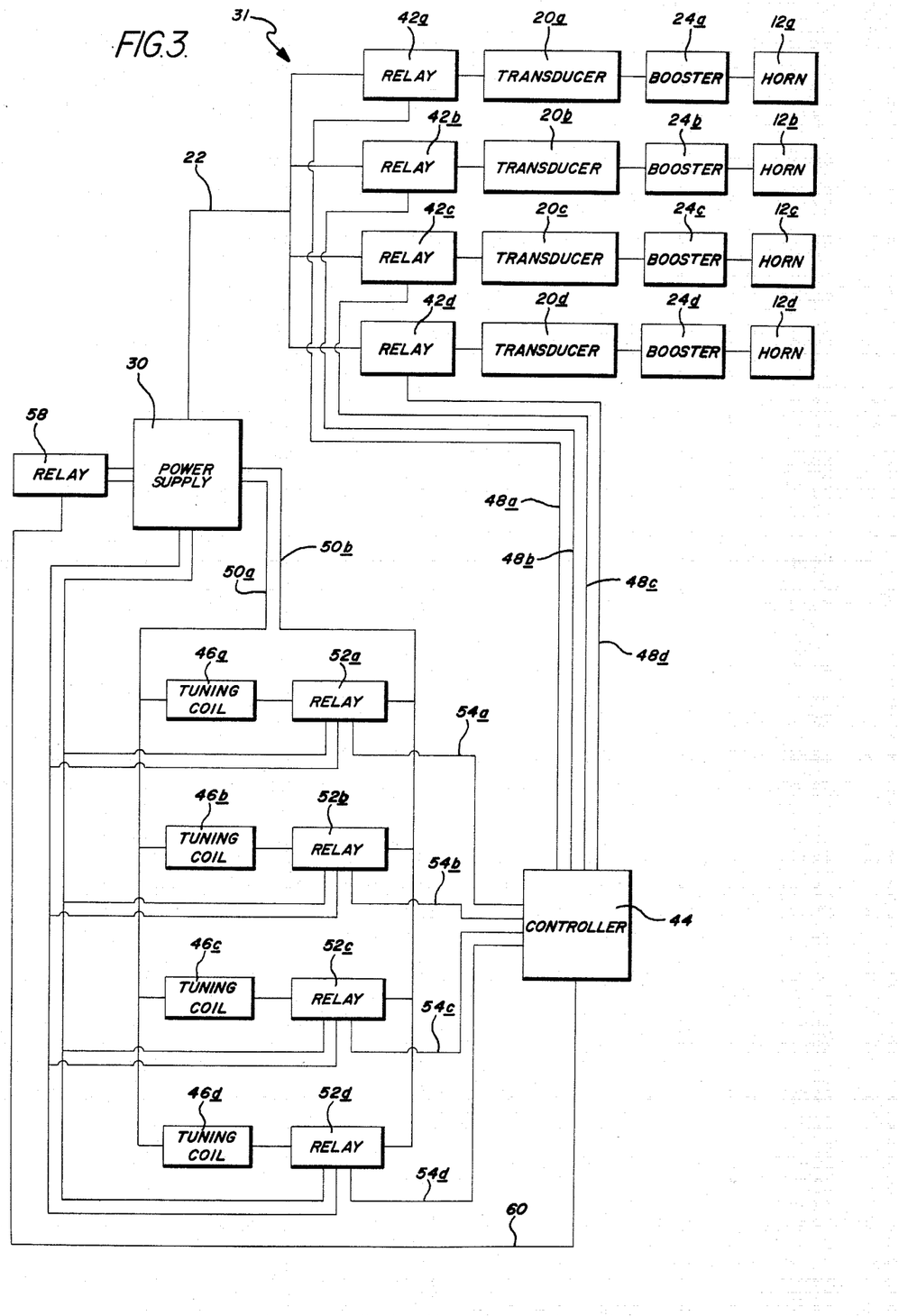
FIG. 3 is a schemmatic, block diagram view depicting the electrical control system of the welding system illustrated in FIG. 1, said system adapted to shunt power from the r.f. power supply across the transducers.

As should be abundantly clear, the most important advantage of the instant invention is that it enables the single r.f. power generator 30 to energize a plurality of multiconfigured, multimassed welding horns 12, thus saving substantial (1) amounts of money in the elimination of some r.f. power generators and (2) space otherwise appropriated to house the r.f. power generators in the ultrasonic welding apparatus 10. These features become increasingly important as the number and differing shapes of the welding horns 12 and associated transducers 20 increase. FIG. 3 illustrates the operation of the sequencing and switching network utilized to accomplish the principle objectives of the present invention. While the network shown and described with reference to FIG. 3, explains the operation of only one r.f. power generator, the other r.f. power generators of FIG. 1 operate in a substantially identical manner. More specifically, a single r.f. power generator 30 and four transducers 20, each transducer 20 having a booster 24 and a welding horn 12 associated therewith and mechanically coupled thereonto. Each transducer 20 is connected to the r.f. power generator 30 via a transmission cable 22 of sufficient capacity to transmit a 20 kilohertz r.f. signal. The cable connection from each transducer 20 to the r.f. power generator 30 is interupted by an r.f. switching relay 42 which is adapted to open and close the transmission of the r.f. signal from the transducer 20 to the r.f. power generator 30. One such relay having particular utility in the instant invention is a Durakool mercury relay Model BF7032, although other similar or equivalent relays may also be employed without departing from the instant invention.

The r.f. switching relays 42 are responsive to commands issued by a controller 44 which is adapted to emit signals thereto via associated r.f. relay control lines 48. The controller 44 is adapted to sequentially energize the r.f. switching relays 42, thereby ultimately connecting the transducers 20 to and disconnecting the transducers 20 from the r.f. power generator 30. The controller 44 is a solid state programmable member such as the Texas Instruments Model 510-1101 programmable controller with a 510-2101 expansion input/output module. Similar or equivalent models manufactured by Texas Instruments or other companies may be used without departing from the scope of the invention.

In order to "tune" the r.f. signal provided by the power generator to match the impendence of a given transduce/booster/welding horn workpiece assembly, and thereby optimize the power and amplitude of the ultrasonic vibrations delivered to a workpiece, a special tuning network is provided. More particularly, if the impedence of the r.f. power generator 30 does not properly match that of the other components in the system, the strength of the ultrasonic vibrations may be too weak. For example, improper tuning may cause insufficient power to be delivered to the tip 13 of the welding horn 20, thereby resulting in slow cycle times, weak welds, or a complete failure of the weld joint. For this reason, r.f. power generators 30 used in ultrasonic welding operations are provided with and adapted to be tuned by tuning coils, generally 46. Each tuning coil 46 is set at a predetermined value depending, inter alia, upon the specifications of the transducer 20, the configuration and mass of the associated booster 24, the configuration and mass of the associated welding horn 12, and the thickness, material and configuration of the regions of the workpiece to be welded. For example, if the size, mass or shape of the welding horn 12 were changed, a corresponding change in tuning of the signal from the r.f. power generator 30 would be necessitated; likewise, if the material of the workpiece 40 were thickened, tuning of the signal from the r.f. power generator 30 would have to be correspondingly changed.

Although, in an elementary ultrasonic welding system (such as Abildgaard's system refered to and discussed hereinabove) embodying multiple welding horns 12 and a single r.f. power generator 30, it is possible that a single tuning coil 46 could be made to suffice, this would require (1) the welding horns to be of substantially identical size, shape and mass, and (2) all weld joints of the workpiece to be of similar thickness and material. If such were the case, a single tuning coil 46 for the r.f. power generator 30 would be capable of operating the system without the sequential tuning feature of the instant invention.

However, most multiple-horn weld systems are much more complex; workpieces commonly include weld areas of varying thickness and/or shape, thus necessitating the use of different transducer 20, differently shaped and massed welding horns 12, as well as differently modulated levels of acoustic energy. Since this invention provides for tuning the r.f. signal supplied by the r.f. power generator 30 to predetermined specifications, it is readily adaptable to the specific physical characteristics of each individual weld joint.

With the foregoing in mind and referring again to FIG. 3, a plurality of tuning coils 46, each of which are adapted to be pre-adjusted to the tuning specifications of a particular welding operation, are connected to the r.f. power generator 30 via wires 50a and 50b. The tuning coils 46 are associated with a tuning coil relay 52, which, when activated, completes a circuit operatively connecting a particular tuning coil 46 to the r.f. power generator 30. Each of the coil relays 52 is responsive to signals emitted by the controller 44 via a coil relay control line 54. The controller 44 is adapted, in the normal sequence of operation, to sequentially activate each coil relay 52, and connect the tuning coil 46 associated therewith to the r.f. power generator 30, thereby tuning the r.f. signal transmitted therefrom to the predetermined characteristics of the transducer/booster/welding horn/workpiece combination.

Model 100-146-677 tuning coils manufactured by the Branson Corp. may be used, although other types of coils may also be employed without departing from the spirit of the present invention. The coil relays 52, utilized in this embodiment of the instant invention, are AMS Potter and Brumfield Model KRP 11AG relays, which are provided with two sets of switching contacts. The second set of contacts in the coil relay 52 are adapted to initiate the generation of an r.f. signal from the r.f. power generator 30. This is accomplished when the coil relay 52 closes a trigger circuit within the r.f. power generator 30. If a coil relay 52 having only one set of contacts were used, rather than the dual contact coil relay 52 described above, an additional trigger relay would be required to initiate the generation of r.f. power. Obviously, this additional trigger relay would have to be operatively connected to the controller. Finally, a start relay 58 is also operated by the controller 44, said start relay 58 adapted to provide electrical input power to the r.f. power generator 30 via control line 60.

The following description depicts a typical, hypothetical operational sequece involving the use of the single r.f. power generator 30 and the four welding horns 12a, 12b, 12c and 12d shown in FIG. 3: (1) The controller 44 sends a pulse to the start relay 58 via the start relay control line 60, thus initiating operation of the r.f. power generator 30; (2) the controller 44 then closes the r.f. relay 42a by sending a signal through control line 48a, thereby connecting the transducer 20a to the r.f. power generator 30 via cable 22; (3) the r.f. relays 42b, 42c and 42d are simultaneously open circuited, thus preventing an r.f. signal from traveling to the associated transducers 20b, 20c and 20c; (4) the controller 44 then activates, via control line 54a, the coil relay 52a, thereby operatively connecting the tuning coil 46a to the r.f. power generator 30 via line 50a; and (5) the coil relays 52b, 52c and 52d are simultaneously open circuited, thus preventing the tuning coils 46b, 46c and 46d from tuning the r.f. signal being transmitted by the r.f. power generator 30 to transducer 20a. In this manner, a properly tuned r.f. signal is transmitted to the transducer 20a which converts that r.f. signal to an acoustic signal. The booster 24a adjusts the power and amplitude of the acoustic signal, which signal is transmitted to the welding tips 13 of the welding horn 12a for furnishing tailored ultrasonic vibrations to the workpiece. The duration of the acoustic energy signal is also monitored by the controller 44 which reverses the previously described sequence of events to terminate the r.f. signal transmitted to the transducer 20a. In a similar manner, welding horns 12b, 12c, and 12d are adapted to be sequentially energized.

Obviously, a welding system comprising a different number and array of multiconfigured and multimassed welding horns 12 may be operated from a single r.f. power generator 30, as long as the r.f. power generator is selected so that it has a sufficient capacity to operate the largest transducer 20 in a welding system. Through the use of the appropriate tuning coils 46, the output signal of the r.f. power generator 30 may be adjusted to suit the characteristics of any combination of transducers, boosters, welding horns and workpieces. It should be apparent that a welding system may also be operated in accord with a principles of the instant invention, said system comprising a plurality of r.f. power generators, each of which energizes a plurality of welding horns, but which system is controlled by a single controller.

It should be understood that the present invention is not limited to the precise structure of the illustrated embodiments; numerous modifications and variations of the illustrated method and apparatus may be practiced in keeping with the spirit of the invention. It is intended that the foregoing description of the presently preferred embodiment be regarded as an illustration rather than a limitation of the present invention. It is the following claims, including all equivalents, which are intended to define the scope of the invention.

What is claimed is:

1. In an ultrasonic welding system which includes: r.f. power generating means for transmitting r.f. signals; a plurality of transducers for (1) receiving the r.f. signals from the r.f. power generating means, (2) converting the r.f. signals into acoustic energy, and (3) transmitting the acoustic energy into an associated welding horn; and a plurality of welding horns for (1) receiving the acoustic energy from an associated transducer and performing a plurality of ultrasonic welding operations on a workpiece, the improved welding system comprising, in combination:

means for sequentially providing a preselected individually tuned r.f. signal to each of the transducers from the r.f power generating means, whereby a single r.f. generating means is adapted to sequentially supply specifically tuned power to each of a plurality of the transducers so that individually tailored acoustic energy may be transmitted to each of the welding horns.

2. Apparatus as in claim 1, wherein the workpiece includes regions to be welded of differing cross-sectional thickness, and the tuning means are adapted to individually tune the r.f. signal transmitted to each transducer, whereby said r.f. signal is tailored to the specific physical characteristics and properties of the particular workpiece region.

3. Apparatus as in claim 1, wherein the welding horns are multiconfigured and multimassed, and the tuning means are adapted to individually tune the r.f. signal transmitted to each transducer, whereby said r.f. signal is tailored to the specific physical characteristics and properties of the welding horn associated therewith.

4. Apparatus as in claim 3, wherein the workpiece includes regions to be welded of differeing cross-sectional thickness, and the tuning means is further adapted to individually tune the r.f. signal transmitted to each transducer, whereby said r.f. signal is tailored to the specific physical characteristics and properties of the (1) particular workpiece region being welded and (2) the particular welding horn associated with said particular workpiece region.

5. Apparatus as in claim 4, wherein the welding system further comprises means for sequentially transmitting a tuned r.f. signal of predetermined magnitude to each of the transducers.

6. Apparatus as in claim 5, wherein the sequencing means is pre-programmed to sequentially a transmit turned r.f. signal of predetermined duration to each of the transducers.

7. Apparatus as in claim 1, wherein the tuning means comprises a plurality of tuning coils equal in number to the number of transducers, the transducers being equal in number to the number of welding horns; one of the plurality of transducers being associated with a particular welding horn; each tuning coil associated with a particular transducer and its associated welding horn, whereby each tuning coil is preadjusted to provide specifically tuned power to its associated transducer.

8. In an ultrasonic welding system which includes: a plurality of r.f. power generating means adapted to transmit r.f. signals; a plurality of transducers, greater in number than the number of said r.f. power generating means, each transducer adapted to (1) receive an r.f. signal from an associated one of the power generating means, (2) convert the r.f. signal into acoustic energy and (3) transmit the acoustic energy to an associated welding horn; and a plurality of welding horns for (1) receiving the acoustic energy from an associated transducer and performing a plurality of ultrasonic welding operations on a workpiece; the improved welding system comprising in combination;

means for sequentially providing a preselected individually tuned r.f. signal to each of the transducers from its associated r.f. power generating means, whereby at least of the r.f. power generating means is adapted to supply specifically tuned power to a plurality of the transducers so that individually tailored acoustic energy is transmitted to each of the welding horns.

9. Apparatus as in claim 8, wherein the workpiece includes regions to be welded of differing cross-sectional thickness, and the tuning means are adapted to individually tune the r.f. signals transmitted to each transducer, whereby said r.f. signal is tailored to the specific physical characteristics and properties of the particular workpiece region.

10. Apparatus as in claim 8, wherein the welding horns are multiconfigured and multimassed, and the tuning means are adapted to individually tune the r.f. signal transmitted to each transducer, whereby said r.f. signal is tailored to the specific physical characteristics and properties of the welding horn associated therewith.

11. Apparatus as in claim 10, wherein the workpiece includes regions to be welded of differing cross-sectional thickness, and the tuning means is further adapted to individually tune the r.f. signal transmitted to each transducer, whereby said signal is tailored to the specific physical characteristics and properties of the (1) particular workpiece region being welded, and (2) the particular welding horn associated with said particular workpiece region.

12. Apparatus as in claim 11, wherein the welding system further comprises means for sequentially transmitting tuned r.f. power to each of the transducers.

13. Apparatus as in claim 12, wherein the sequencing means is pre-programmed to sequentially transmit a tuned r.f. signal of predetermined duration to each of the transducers.

14. Apparatus as in claim 8, wherein the tuning means comprises a plurality of tuning coils equal in number to the number of transducers, the transducers being equal in number to the number of welding horns; each of the plurality of transducers being associated with a particular welding horn; each tuning coil associated with a particular transducer and its associated welding horn, whereby each tuning coil is preadjusted to provide a specifically tuned r.f. signal to its associated transducer.

15. A method for performing a plurality of ultrasonic welding operations to unitize a workpiece, the method comprising the steps of:

providing a plurality of welding horns;

placing the workpiece in weldable contact with the welding horns such that each of the regions of the workpiece to be welded are contacted by a welding horn;

operatively connecting a transducer to an associated one of the welding horns, the transducers adapted to receive an r.f. signal, convert said r.f. signal into acoustic energy and transmit said acoustic energy to the associated welding horn;

providing r.f. power generating means for sequentially transmitting an r.f. signal to each of the transducers; and sequentially tuning the r.f. signal transmitted to each transducer, whereby an r.f. signal particularly tailored to the physical characteristics and power requirements of each individual transducer and its associated welding horn is provided.

16. A method as in claim 15, further including the step of sequentially transmitting the tuned r.f. signal to each of the transducers for an interval sufficient to weld the workpiece.

17. A method as in claim 15, wherein the step of tuning the r.f. signal includes the further steps of: adjusting a tuning coil to provide an r.f. signal particularly adapted for use with a particular transducer and welding horn; and connecting the tuning coil to the r.f. power generating means.

* * * * *